United States Patent [19]
Capper et al.

[11] Patent Number: 5,189,463
[45] Date of Patent: Feb. 23, 1993

[54] CAMERA AIMING MECHANISM AND METHOD

[75] Inventors: David G. Capper, 49 Edwards Ave., Sausalito, Calif. 94965; Stanley H. Axelrod, Port Orchard, Wash.

[73] Assignee: David G. Capper, Sausalito, Calif.

[21] Appl. No.: 835,192

[22] Filed: Feb. 12, 1992

[51] Int. Cl.$^5$ .............................................. G03B 13/00
[52] U.S. Cl. .................................... 354/403; 354/165; 354/219
[58] Field of Search ............... 354/403, 162, 165, 166, 354/219

[56] References Cited

U.S. PATENT DOCUMENTS

| | | | |
|---|---|---|---|
| 2,642,790 | 6/1953 | Scholkemeier | 354/165 |
| 2,701,500 | 2/1955 | Schwartz et al. | 354/166 |
| 3,008,398 | 11/1961 | Sanborn | 354/165 |
| 3,754,249 | 8/1973 | Kearney, II | 343/6 R |
| 4,386,848 | 6/1983 | Clendenin et al. | 356/5 |
| 4,572,262 | 2/1986 | Arndt et al. | 359/643 |
| 4,672,436 | 6/1987 | Hawthorne | 354/219 |
| 4,689,016 | 8/1987 | Eichweber | 434/22 |
| 4,818,865 | 4/1989 | Matsui et al. | 354/403 |
| 4,884,137 | 11/1989 | Hanson et al. | 358/108 |
| 4,914,460 | 4/1990 | Caimi et al. | 354/162 |
| 4,963,017 | 10/1990 | Schneiter et al. | 354/403 |
| 4,969,006 | 11/1990 | Ishibashi et al. | 354/402 |
| 5,005,213 | 4/1991 | Hanson et al. | 455/617 |
| 5,038,162 | 8/1991 | Tejima | 354/221 |
| 5,054,917 | 10/1991 | Pepin et al. | 356/152 |

Primary Examiner—Michael L. Gellner
Assistant Examiner—David M. Gray
Attorney, Agent, or Firm—Kolisch, Hartwell, Dickinson, McCormack & Heuser

[57] ABSTRACT

The invention includes a camera that receives light from a field of view, produces signals representative of the received light, and intermittently reads the signals to create a photographic image. The intermittent reading results in intermissions between readings. The invention also includes a radiant energy source that works with the camera. The radiant energy source produces a beam of radiant energy and projects the beam during intermissions between readings. The beam produces a light pattern on an object within or near the camera's field of view, thereby identifying at least a part of the field of view. The radiant energy source is often a laser and the radiant energy beam is often a laser beam. A detection mechanism that detects the intermissions and produces a signal that causes the radiant energy source to project the radiant energy beam. The detection mechanism is typically an electrical circuit including a retriggerable multivibrator or other functionally similar component.

The invented method is used with a camera that is aimed toward a field of view by a light beam that produces a light pattern identifying at least a part of the field of view. The method photographs the field of view without photographing the light pattern produced by the light beam. The method includes the steps of receiving light, producing signals representative of the received light, intermittently reading the signals to create a video photograph, where the intermittent reading results in intermissions between readings, recognizing the intermission and causing the light beam to produce the light pattern during intermissions only.

26 Claims, 2 Drawing Sheets

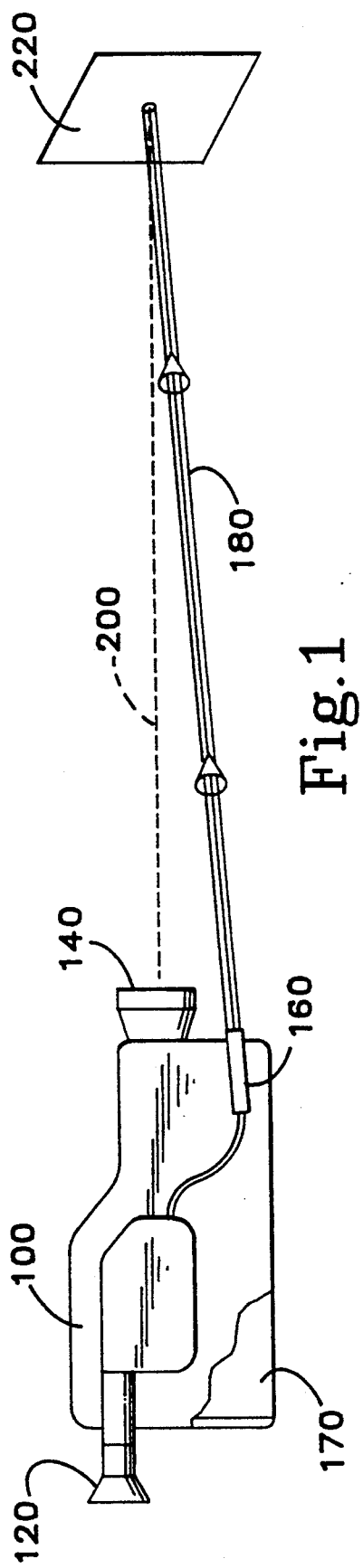
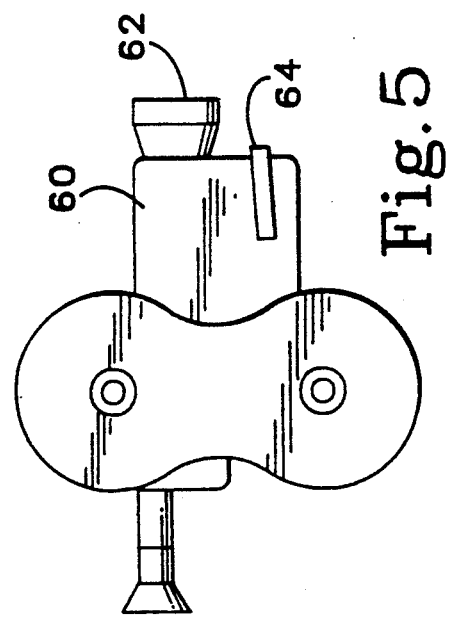
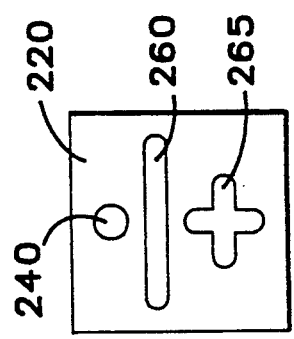
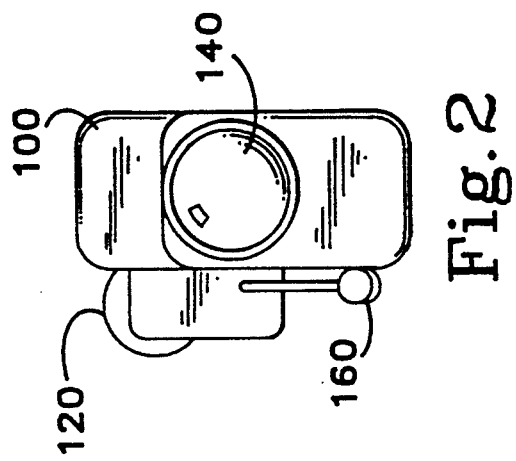

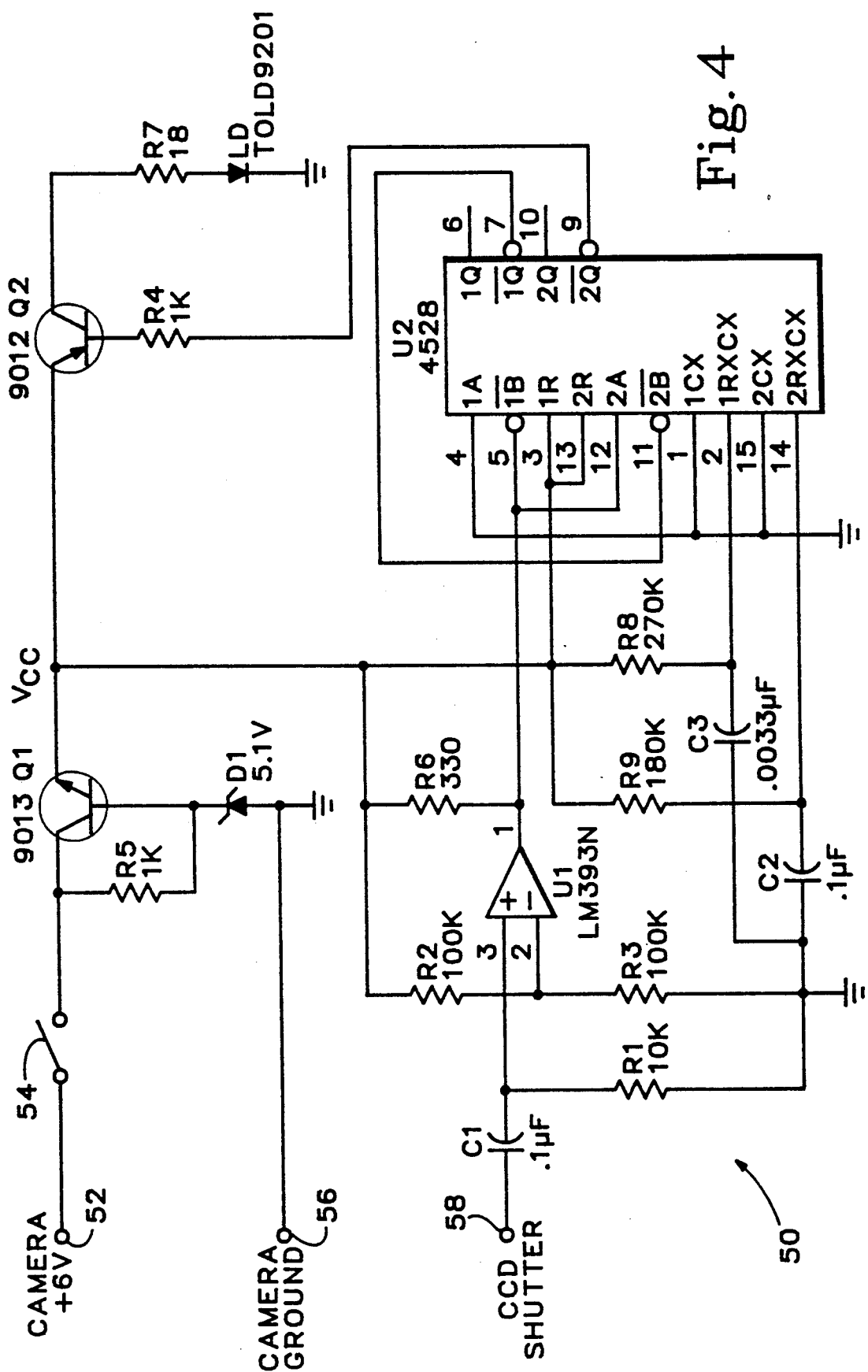

CAMERA AIMING MECHANISM AND METHOD

TECHNICAL FIELD

This invention relates to cameras. More particularly, this invention relates to aiming mechanisms for cameras and to methods of aiming cameras. This invention is an improvement on the invention described in copending U.S. patent application Ser. No. 07/813,373, filed Dec. 23, 1991.

BACKGROUND ART

A camera is a device for taking still or moving pictures. A video camera is a camera that electronically processes an image. Typically, video camera are used to take moving pictures or to photograph transient visual images. Television cameras and camcorders are examples of video cameras.

A video camera typically includes a body or enclosure, a lens, a viewfinder and a light-sensitive device which converts light into electrical signals. Light enters the camera by passing through the lens. The light which passes through the lens is either reflected or projected from objects within the camera's field of view. The camera's field of view is what the camera sees or what will be included in a photograph taken by the camera. The lens, in turn, focuses the light onto the light-sensitive device. The light-sensitive device then produces various electrical signals.

The electrical signals represent the light from the camera's field of view. The signals are then used to produce an image of the field of view in a viewfinder, on a television or both. Alternatively, the signals are used to record the image on video tape or some other media. The signals may also be used for other purposes.

Motion picture cameras are cameras that record images on film by opening and closing a shutter. Motion picture cameras also include a body or enclosure, a lens and a viewfinder. Light enters the camera through the lens and the shutter opens and closes allowing the light to strike film.

Both video cameras and motion picture cameras are aimed by looking into the camera's viewfinder and seeing the image displayed. Again, the displayed image is the camera's field of view or what the camera sees. The camera is properly aimed when the viewfinder displays the desired image.

In many instances, however, a user would like not to be dependent on a viewfinder to aim the camera, such as when a user is photographing motion or photographing around obstructions such as other people or other photographers. In those situations using a viewfinder makes it more difficult to properly aim the camera because the camera must be held near the person's eye. Holding a camera near an eye limits the person's peripheral vision making it difficult for the person to take photographs of moving subjects or around obstructions. It is also difficult for people who wear glasses to hold and properly aim a video camera because the glasses are interposed between the camera's viewfinder and the person's eye.

This invention addresses those shortcomings and provides a mechanism and method to aim a camera without having to look into the camera's viewfinder. Thus, the peripheral vision of the person using the camera is not limited by the camera. The invention also allows a photographer to hold a camera in any physical position, take photographs from almost any angle and even to be away from the camera and still properly aim the camera. That allows a photographer to take photographs which would otherwise be impossible to take accurately. Additionally, the invention allows a person to aim a camera by looking toward an object to be photographed, rather than by looking into a viewfinder or toward a television screen.

SUMMARY OF THE INVENTION

The invention includes a camera that receives light from a field of view, produces signals representative of the received light, and intermittently reads the signals to create a photographic image. The intermittent reading results in intermissions between readings. The invention also includes a radiant energy source that works with the camera. The radiant energy source produces a beam of radiant energy and projects the beam during intermissions between readings. The beam produces a light pattern on an object within or near the camera's field of view, thereby identifying at least a part of the field of view. The radiant energy source is often a laser and the radiant energy beam is often a laser beam. A detection mechanism that detects the intermissions and produces a signal that causes the radiant energy source to project the radiant energy beam. The detection mechanism is typically an electrical circuit including a retriggerable multivibrator.

The invented method is used with a camera that is aimed toward a field of view by a light beam that produces a light pattern identifying at least a part of the field of view. The method photographs the field of view without photographing the light pattern produced by the light beam. The method includes the steps of receiving light, producing signals representative of the received light, intermittently reading the signals to create a video photograph, where the intermittent reading results in intermissions between readings, recognizing the intermission and causing the light beam to produce the light pattern during intermissions only.

BRIEF DESCRIPTION OF THE DRAWINGS

FIG. 1 is a simplified side view of a video camera with a radiant energy source.

FIG. 2 is a simplified front view of the camera shown in FIG. 1.

FIG. 3 is a plan view of two light patterns.

FIG. 4 is a circuit diagram of a detection mechanism for a video camera.

FIG. 5 is a simplified side view of a motion picture camera with a radiant energy source.

DETAILED DESCRIPTION AND BEST MODE FOR CARRYING OUT THE INVENTION

The preferred embodiment of the invented photographic apparatus includes a camera such as the camcorder shown at 100 in FIGS. 1 and 2. Camcorder 100 includes a viewfinder 120 and a lens 140. Of course, other types of cameras including VHS cameras, television cameras and movie cameras may be used.

A radiant energy source 160 is mounted on an 8 millimeter camcorder 100. Radiant energy source 160 projects a radiant energy beam 180 that identifies at least a part of the camera's field of view. The radiant energy source is powered by a battery 170 within the camcorder. Alternatively, the radiant energy source may be powered by an AC connection with a DC adaptor or some other power supply.

In the preferred embodiment the radiant energy source is a laser diode and the radiant energy beam is a laser beam. Other types of radiant energy sources and beams may be used, including light emitting diodes, incandescent, halogen, ultraviolet or x-ray light sources. Of course, radiant energy sources that project invisible energy beams, like ultraviolet, infrared or x-ray beams, may be used with an appropriate ultraviolet, infrared or x-ray camera, or they may be used to aim a camera toward flourescent or phosphorescent objects.

As shown in FIG. 1, radiant energy source 160 projects a radiant energy beam 180 out from camcorder 100. Radiant energy beam 180 is directed toward a predetermined point within camcorder 100's field of view. In FIG. 1, dashed line 200 illustrates the center of the camcorder's field of view. Both beam 180 and line 200 strike a target 220. Target 220 is simply an object within the camera's field of view, it is not necessarily the main subject within the field of view. If target 220 were positioned closer to or farther away from the camcorder, then beam 180 may be adjusted. In most cases, however, the beam will not need adjusting because it is at such a small angle relative to the center of the camcorder's field of view that it strikes the target near enough to the center of the field of view to allow proper aiming. Alternatively, beam 180 could be projected parallel to line 200 or even superimposed over line 200 by mirrors that reflect the beam out through lens 140. Typically, the radiant energy beam is collimated to produce a distinguishable energy pattern when projected on an object.

In FIGS. 1 and 2 the radiant energy source is mounted on the outside of camcorder 10. Alternatively, the radiant energy source could be mounted inside the camcorder and positioned to project a beam out from the camcorder. The radiant energy source may also be mounted at different positions on the camcorder, or remote from the camcorder and simply used in conjunction with it. The beam may also be reflected out from the camcorder by mirrors.

Camcorder 100 is aimed by pointing it toward an object. The person using the camcorder causes the radiant energy source to project a radiant energy beam and then directs the beam toward the object. When the beam strikes the object, it produces a light pattern visible on the object. The object may be the subject of the photograph, something beside the subject, or any other object within the field of view. Alternatively, the beam may strike a object adjacent but outside the camcorder's field of view. By seeing the location of the light pattern on the object and by knowing the relationship between the camcorder and the light beam, the user knows where the camcorder is aimed without looking through the camcorder's viewfinder.

If the radiant energy source projects ultraviolet, infrared or other light invisible to the naked eye, the user may need special glasses or another device to detect or see the light pattern. In that case, if the user is using a camera that detects light visible to the naked eye, then the radiant energy beam can be projected continuously, without pulsing because it will not be detected by the camera.

Typically, with a light beam the light pattern will be a dot, line or cross hair of light. A representative dot of light is shown in FIG. 3 at 240. Dot of light 240 is shown striking target 220. A representative line of light is shown at 260, also striking target 220. A cross hair or cross pattern of light is shown at 265. Cross hair 265 may define the height and breadth of the camcorder's field of view. Any other orientation of line 260 or cross hair 265, or virtually any other light pattern is possible. For example, the light pattern may be a circle or square that borders the camcorder's field of view. Line 260, cross hair 265 or other patterns may be made by projecting the line or pattern, moving the radiant energy source or by using reflectors.

The ability to aim a camera without looking through the camera's viewfinder allows for a user to look toward the scene to be photographed without sacrificing peripheral vision. This is important in photography because subjects and alternative subjects are often moving. A user's peripheral vision allows the user to see all the subjects as they move toward the camera's field of view while also aiming the camera.

Video cameras such as camcorder 100 continually process images when the camera is photographing. Thus, it is important to be able to continually aim the camera while photographing. But it is also important that the light pattern produced by the radiant energy beam not appear on the processed image. If the radiant energy beam was constantly on, then the light pattern would be visible in the processed image. The invention addresses that problem by recognizing that there are periods of time when video cameras are photographing that the cameras are insensitive to light. The invention only projects radiant energy during the time when the camera is insensitive to light. Thus, the light pattern produced by the radiant energy does not appear on the recorded image.

As stated earlier, video cameras process images by converting light into electrical signals and then either recording the signals or using them to produce an image. Light enters the video camera through a lens and strikes a light-sensitive device. The light sensitive device creates different signals depending on the intensity of the light and the length of time the light strikes the device.

The light-sensitive device for many cameras, such as television cameras, is a vidicon or an image orthicon. Vidicons and image orthicons are camera tubes, each with a light-sensitive surface such as a photoconductor like antimony trisulfide. A photoconductor is a material which changes electrical conductivity under varying amounts of light. Thus, when light strikes a photoconductor, the photoconductor's electrical characteristics change.

The photoconductor is then scanned by an electron beam. The electron beam detects the changed characteristics of the photoconductor. The changed characteristics may also be thought of as signals produced by the photoconductor, and the electron beam intermittently reads those signals.

When the electron beam scans the photoconductor, it typically begins scanning in the upper left corner of the photoconductor and proceeds across to the right and slightly downward. When the right-hand side is reached, the electron beam retraces rapidly to a position below its starting position and again proceeds to the right and slightly downward. That continues until the electron beam reaches the bottom of the photoconductor. At that point, the beam returns to the top and repeats the process, except that the beam may scan lines that fall between the previously scanned lines. The next scanning would begin where the first scanning started, the subsequent scanning would begin where the second scanning started, and so on.

Each scanning of the photoconductor is called a field. Because every other scanning traces out different horizontal lines, there are two fields to each image. In other words, each image is produced from two scans of the photoconductor or other light-sensitive device. The image produced is called a frame. Thus, each frame includes two fields.

In the United States, television cameras typically scan 525 horizontal lines and 60 fields or 30 frames every second. In Europe, television cameras typically scan 625 lines and 50 fields or 25 frames each second. Video or television photographs are simply a series of frames displayed on a television screen or other device. The frames are updated faster than the human eye can see, thus creating moving or transient images.

As stated above, after the electron beam has scanned a horizontal line or a field, the beam retraces to a new starting position. To prevent the retracing from affecting the image produced by the camera, a blanking signal or pulse is included. The blanking pulse effectively "shuts off" the beam as it returns to its new position. The periods of blanking may be thought of as intermissions between scans or between intermittent readings of the signals. The intermissions may be between horizontal scans, between entire field scans or at any other time when the beam is "shut off" or the camera is insensitive to light.

The invented aiming mechanism, when used with a vidicon, image orthicon or other similar camera, recognizes the blanking pulses and only projects radiant energy during blanking. In other words, the radiant energy is pulsed on during blanking and turned off during scanning. The pulsing is so rapid, however, that the light pattern produced by the radiant energy appears continuous to the eye.

The light-sensitive device for many video cameras is a charge coupled device or CCD. A CCD is a device which is similar to a vidicon or image orthicon because it also includes a light-sensitive surface capable of discriminating an image by converting light energy to electrical charge. The surface is made up of an array of light-sensitive elements called pixels. Each pixel is made from a light-sensitive material such as doped silicon, and each pixel can produce its own electrical signal. A typical CCD is approximately $\frac{1}{3}$rd-of-an-inch square and may include around 300,000 pixels. Each pixel of the CCD is addressed so that each pixel's signal can be located and read when desired.

Light enters the video camera's lens and strikes the CCD. The pixels then convert the light to electrical signals. The signals are then read in a predetermined order, such as left to right and top to bottom. After the pixels are read, they are discharged or reset so that they can produce subsequent signals. The signals are then processed to create video images.

As with television cameras, the signals produced by a CCD are intermittently read over a given time period to produce fields and/or frames of images. Different video cameras may read their respective CCDs over various time periods, but a typical cycle of reading all pixels is approximately 16.7 milliseconds or 1/60th-of-a-second. That time is called a 1/60th-of-a-second shutter speed because it allows each pixel to be sensitive to light for 16.7 milliseconds, which is analogous to a shutter that is open for 1/60th of a second.

FIG. 4 shows an electrical circuit 50 describing a detection mechanism for use with a Canon E40 camcorder. The mechanism detects intermissions between readings and produces a signal that causes the radiant energy source to project the beam of radiant energy when the intermissions are detected.

The Canon E40 camcorder includes a CCD. It takes approximately 16.7 milliseconds to read the CCD at 1/60th-of-a-second shutter speed. The Canon E40 camcorder also allows the user to choose between shutter speeds of 1/60th-of-a-second, 1/100th-of-a-second and 1/1000th-of-a-second. Faster shutter speeds take in less light so are a disadvantage in low light situations, but they reduce blurred motion.

The circuit shown in FIG. 4 is designed for a shutter speed of 1/100th-of-a-second because at that shutter speed the camera's pixels are only sensitive to light for 10 milliseconds. Even at 1/100th-of-a-second shutter speed it still takes approximately 16.7 milliseconds to read all the signals produced by the pixels, so that leaves a period of around 6.7 milliseconds during each reading of the CCD when the pixels are insensitive to light. That 6.7 millisecond period is an intermission or blanking period between readings of the signals. The circuit shown in FIG. 4 is designed to project a radiant energy beam only during each 6.7 millisecond intermission when the camera is insensitive to light.

Circuit 50 is powered at 52 by the Canon E40 battery, which supplies approximately positive 6 volts. As stated, the circuit could be powered by another power supply. The power to the circuit is controlled by on/off switch 54. The circuit is grounded at 56 by the camera's ground. The circuit powers and controls a standard TOLD9201 laser diode labeled LD in FIG. 4. The laser diode projects a laser beam when triggered.

R5 is a 1 k resistor connected to both a zener diode D1 with a zener voltage of 5.1 V and to a 9013 transistor labeled Q1. The resister, diode and transistor constitute a simple voltage regulator to ensure that the laser diode is not overdriven if the voltage from the camera should get too high.

Point 58 is connected to the CCD shutter signal produced by the camera. At 1/100th-of-a-second shutter speed, the camera produces a 3 microsecond-long electrical pulse every 60 microseconds during each 6.7 millisecond period when the pixels are insensitive to light. Those pulses are blanking pulses which cause the CCD's pixels to be insensitive to light. Circuit 50 detects those pulses and uses them to trigger the laser diode.

The pulses from the camera are first compared by the comparator including R2, R3, R6 and operational amplifier LM393N labeled U1 in FIG. 4. The comparator simply ensures a useable voltage. The numbers 1 through 3 surrounding operational amplifier U1 designate pin numbers for the LM393N chip. Pin 8 on the LM393N chip is held at $V_{cc}$ and pin 4 is held at ground.

Capacitor C1 is a 0.1 microfarad capacitor. It works with resistor R1, a 10 k ohm resistor, to change the CCD signal to bring the signal within the range of the comparator.

The output of the comparator is connected to two retriggerable monostable multivibrators or one-shots. One-shots are devices that produce an output signal when they receive an appropriate input signal. Retriggerable means that the output from the one-shot is retriggered or extended if the one-shot receives the appropriate input signal during the output of a signal. The one-shots form part of a 4528 chip labeled U2 in FIG. 4. The numbers surrounding the outside of U2 designate pin numbers for the 4528 chip. The manufacture and operation of the 4528 chip is well known.

The inputs to the two one-shots are labeled 1 and 2, respectively, on the inside of the chip. 1A and 1B are inputs for the number 1 one-shot and are located at pins 4 and 5, respectively. The outputs for the number 1 one-shot are labeled 1Q and are located at pins 6 and 7, respectively. 2A and 2B are inputs for the number 2 one-shot and they are located at pins 12 and 11 respectively. The outputs for the number 2 one-shot are labeled 2Q and they are located at pins 9 and 10, respectively. As is evident from FIG. 4, the outputs on both pins 6 and 10 are not used. Additionally, pin 16 on the 4528 chip (not shown) is held at $V_{cc}$ and pin 8 on the chip (not shown) is held at ground. As shown in the drawing, the output of the comparator is connected to pins 5 and 12 of the 4528 chip.

The time duration of the output signal for the number 1 one-shot is controlled by the resistance-capacitance combination input at 1RXCX. That combination is defined by C3 and R8, which are connected to the one-shot at pin 2. The value of C3 is 0.0033 microfarads and the value of R8 is 270 k ohms. Those values produce an output signal slightly larger than 60 microseconds.

The time duration of the output signal for the number 2 one-shot is controlled by the resistance-capacitance combination input at 2RXCX. That combination is defined by C2 and R9, which are connected to the one-shot at pin 14. The value of C2 is 0.1 microfarads and the value of R8 is 180 k ohms. Those values produce an output signal for the number 2 one-shot of slightly less than 6.7 milliseconds.

The appropriate triggering signal for the number 1 one-shot is a falling edge of a voltage, as represented by the circle at the input of 1B. Additionally, both 1A and 1B enable each other. In other words, 1B only detects a falling edge when 1A is held low, but 1A is always low because it is connected to ground.

The appropriate triggering signal for the number 2 one-shot is a rising edge of a voltage. 2A and 2B are also enabling for each other. 2A only detects a rising voltage if 2B is high. The circle at the input of 2B indicates what signal causes a response by the one-shot.

Pins 3 and 13 on chip 4528 are reset lines which are held high so as not to reset any output. Those inputs are labeled 1R and 2R, respectively. Pins 1 and 15 are labeled 1CX and 2CX, respectively. They are connected to ground and provide access to ground for the chip, C2 and C3.

The first CCD blanking pulse travels from the comparator to pins 5 and 12 on the 4528 chip. Initially the pulse has a rising edge. The number 1 one-shot is not triggered because it does not respond to a rising voltage. One-shot number 2, on the other hand, detects the rising edge and produces an output signal at pin 9. The output signal is defined by the input at 2RXCX and is somewhat less than 6.7 milliseconds in duration. The signal is changed from high to low, as represented by the circle at pin 9. The signal current is limited by resistor R4 and is connected to a 9012 transistor at Q2. Transistor Q2 acts like a switch to control the laser diode. Resistor R7 simply limits the current to the laser diode.

Thus, the laser diode is driven by the output of the number 2 one-shot. With the values selected, the diode is on approximately 6.2 milliseconds or 37% of the time.

The initial CCD pulse is approximately 3 microseconds long. At the end of that time, the number 1 one-shot detects the signal's falling edge and produces an output at pin 7. That output is connected at pin 11 to the input 2B. The output signal is initially high, but changed to low at the circle on pin 7. The low signal disables the number 2 one-shot, thus making the number 2 one-shot unaffected by subsequent pulses. The number 1 one-shot's output signal is slightly larger than 60 microseconds. Therefore, it keeps retriggering as the number 1 one-shot detects subsequent falling edges of CCD pulses and disables the number 2 one-shot for the entire time that CCD pulses are detected. The time that CCD pulses are detected is during the intermission or blanking period.

The laser stops firing off after the number 2 one-shot signal expires, and the camera reads the CCD. The CCD is then blanked and the process repeats. Thus, the number 2 one-shot triggers the laser diode once for about 6.2 milliseconds during each intermission. The difference between the 6.2 millisecond laser firing period and the 6.7 millisecond output signal from the number 2 one-shot is caused by resistor R7.

The circuit shown in FIG. 4 is a retrofit to the existing Canon E40 camcorder. If the invention was integrated into the design of a camera, different circuits may be used and blanking pulses could be supplied whenever desirable. For example, different circuits with appropriate blanking intervals may be used for high definition television. Different circuits may include different components, including discreet transistors, counter chips or microprocessors, and still trigger a radiant energy source during intermissions. Additionally, different and more powerful lasers may also be used requiring less "on" time, thus allowing for shorter laser pulses.

FIG. 5 shows at 60 a motion picture camera incorporating the invention. As stated above, motion picture cameras are cameras that record images on film by opening and closing a shutter. Camera 60 includes a lens 62 and a radiant energy source 64. Radiant energy source 64 would only project a beam of radiant energy when the camera's shutter is closed. Thus, the beam would be pulsed on and off corresponding to the closing and opening of the camera's shutter.

The actual mechanism triggering the radiant energy source may be similar to the circuit shown in FIG. 4, but triggered by a signal from a light meter rather than a CCD signal. The light meter, in that case, would detect the presence of light on the film, thereby signalling when the shutter is closed. Other mechanisms may also be used to signal the opening and closing of the shutter.

Motion picture camera 60 receives light through lens 62. A shutter opens and closes allowing the light to strike the film within the camera. The opening and closing of the shutter may be thought of as producing signals representative of the received light. Allowing the light to strike the film may be thought of as intermittently reading the signals to create a photographic image. The periods of time when the shutter is closed may be thought of as intermissions between readings.

INDUSTRIAL APPLICABILITY

This invention is applicable to the photography industry. Specifically, it is applicable to video and motion picture cameras and to video and motion picture photography. While the preferred embodiment has been disclosed, changes may be made thereto without departing from the spirit of the invention.

We claim:

1. A photographic apparatus with non-viewfinder-dependent aiming capability, the apparatus comprising:
   a camera that receives light from a field of view, produces signals representative of the received light, and intermittently reads the signals to create a photographic image, where the intermittent reading results in intermissions between readings; and
   a radiant energy source operatively associated with the camera for producing a beam of radiant energy and for projecting the beam of radiant energy during intermissions between readings to identify at least a part of the field of view by producing a discernable energy pattern on an object having a known position relative to the field of view.

2. The photographic apparatus of claim 1 where the camera is a video camera.

3. The photographic apparatus of claim 1 where the camera is a motion picture camera.

4. The photographic apparatus of claim 1 where the radiant energy source is a laser and the beam of radiant energy is a laser beam.

5. The apparatus of claim 1 further comprising a detection mechanism operatively associated with both the camera and the radiant energy source for detecting intermissions and for producing a signal that causes the radiant energy source to project the beam of radiant energy when intermissions are detected.

6. The photographic apparatus of claim 5 where the intermissions are characterized by predetermined electrical pulses, the detection mechanism includes a an electrical circuit that detects the electrical pulses, and where the signal is an electrical signal produced by the electrical circuit.

7. The photographic apparatus of claim 6 where the electrical circuit includes at least one multivibrator.

8. The photographic apparatus of claim 7 where the multivibrator is retriggerable.

9. The photographic apparatus of claim 5 where the camera is a video camera, the intermissions are characterized by predetermined electrical pulses, the detection mechanism includes an electrical circuit that detects the electrical pulses, the radiant energy source is a laser and the beam of radiant energy is a laser beam.

10. The photographic apparatus of claim 9 where the video camera is portable and includes a battery, and where the laser is powered by the battery.

11. The photographic apparatus of claim 10 where the battery and laser are both mounted on the video camera.

12. The photographic apparatus of claim 1 where the radiant energy source is separate from the camera but used in conjunction with the camera.

13. The photographic apparatus of claim 1 where the energy pattern frames at least a part of the field of view.

14. An aiming mechanism for a camera that receives light from a field of view, produces signals representative of the received light, and intermittently reads the signals to create photographs, where the intermittent reading results in intermissions between readings, the aiming mechanism comprising:
   a detection mechanism for detecting and signaling intermissions between readings; and
   a radiant energy source operatively associated with the detection mechanism for producing a beam of radiant energy and for projecting the beam of radiant energy to identify at least a part of the field of view when the detection mechanism signals intermissions.

15. The aiming mechanism of claim 14 where the intermissions are characterized by predetermined electrical pulses, the detection mechanism includes an electrical circuit that detects the electrical pulses, and where the electrical circuit signals intermissions by producing an electrical signal.

16. The photographic apparatus of claim 15 where the electrical circuit includes at least one multivibrator.

17. The photographic apparatus of claim 16 where the multivibrator is refriggerable.

18. The aiming mechanism of claim 14 where the radiant energy source is a laser and the beam of radiant energy is a laser beam.

19. The aiming mechanism of claim 14 where the intermissions are characterized by predetermined electrical pulses, the detection mechanism includes an electrical circuit that detects the electrical pulses, the radiant energy source is a laser and the beam of radiant energy is a laser beam.

20. The aiming mechanism of claim 19 where the camera includes a battery and the laser is powered by the battery.

21. The aiming mechanism of claim 20 where the battery and laser are mounted on the camera.

22. The aiming mechanism of claim 14 where the detection mechanism and radiant energy source are separate from the camera but used in conjunction with the camera.

23. The aiming mechanism of claim 14 where the beam of radiant energy identifies at least a part of the field of view by producing a visible light pattern on a object within the field of view.

24. The aiming mechanism of claim 14 where the beam of radiant energy identifies at least a part of the field of view by producing a visible light pattern framing at least a part of the field of view.

25. A method of photographing a field of view with a camera aimed toward the field of view by a light beam that produces a light pattern identifying at least a part of the field of view, without photographing the light pattern produced by the light beam, the method comprising:
   receiving light from the field of view;
   producing signals representative of the received light;
   intermittently reading the signals to create photographs, where the intermittent reading results in intermissions between readings;
   recognizing the intermissions between readings; and
   causing the light beam to produce the light pattern during intermissions only.

26. The method of claim 24 where the light beam is produced by a light source, the step of intermittently reading results in intermissions characterized by predetermined electrical pulses, the step of recognizing the intermissions detects the predetermined electrical pulses, and where the step of causing the light beam to produce the light pattern triggers the light source when predetermined electrical pulses are detected.

* * * * *